United States Patent
Chu et al.

(10) Patent No.: US 11,974,033 B2
(45) Date of Patent: Apr. 30, 2024

(54) OPTICAL CAMERA LENS, INCLUDING AT LEAST THREE SMOOTH REGIONS FOR REFLECTING A LIGHT BEAM EMITTED BY DISTANCE MEASURING EQUIPMENT CAMERA MODULE AND ASSEMBLY METHOD THEREOF

(71) Applicant: Ningbo Sunny Opotech Co., Ltd., Zhejiang (CN)

(72) Inventors: Shuijia Chu, Zhejiang (CN); Lin Liu, Zhejiang (CN); Liefeng Chen, Zhejiang (CN); Chao Ye, Zhejiang (CN); Xiaoming Ding, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 592 days.

(21) Appl. No.: 17/268,322

(22) PCT Filed: Jul. 10, 2019

(86) PCT No.: PCT/CN2019/095389
§ 371 (c)(1),
(2) Date: Feb. 12, 2021

(87) PCT Pub. No.: WO2020/034789
PCT Pub. Date: Feb. 20, 2020

(65) Prior Publication Data
US 2021/0337093 A1      Oct. 28, 2021

(30) Foreign Application Priority Data
Aug. 14, 2018   (CN) .......................... 201810923170.5

(51) Int. Cl.
*H04N 5/335*      (2011.01)
*G02B 7/02*       (2021.01)
(Continued)

(52) U.S. Cl.
CPC ............. *H04N 23/55* (2023.01); *G02B 7/021* (2013.01); *G02B 7/025* (2013.01); *G02B 27/62* (2013.01); *G03B 17/12* (2013.01)

(58) Field of Classification Search
CPC ...................................... G03B 17/12
See application file for complete search history.

(56) References Cited

U.S. PATENT DOCUMENTS 5,267,014 A * 11/1993 Prenninger ............ G01D 5/285
356/152.3
7,042,560 B2   5/2006 Kanemitsu et al.
(Continued)

FOREIGN PATENT DOCUMENTS

CN      101210985      7/2008
CN      102322857      1/2012
(Continued)

OTHER PUBLICATIONS

Extended European Search Report issued Aug. 27, 2021 in corresponding European Patent Application No. 19849568.1.
(Continued)

*Primary Examiner* — Gary C Vieaux
(74) *Attorney, Agent, or Firm* — Wenderoth, Lind & Ponack, L.L.P.

(57) ABSTRACT

An optical camera lens includes a first camera lens component including at least one first lens and a second camera lens component including a second lens barrel and at least one second lens mounted in the second lens barrel. The first and second lenses together constitute an imageable optical system. At least one of the two camera lens components has a smooth region located on an end surface of the camera lens component, and a connecting medium for fixing the first and second camera lens components together. A corresponding assembly method of the optical camera lens and a corresponding camera module and an assembly method thereof (Continued)

are also provided. The optical camera lens can improve a pre-positioning accuracy by improving a height measurement accuracy, and can use a distance measuring point as a feature point of image recognition so as to perform pre-positioning and active calibration.

16 Claims, 5 Drawing Sheets

(51) Int. Cl.
  *G02B 27/62* (2006.01)
  *G03B 17/12* (2021.01)
  *H04N 23/55* (2023.01)

(56) References Cited

U.S. PATENT DOCUMENTS

| | | | |
|---|---|---|---|
| 10,228,532 | B2 | 3/2019 | Wang et al. |
| 2009/0213717 | A1 | 8/2009 | Matsuzaki et al. |
| 2015/0062566 | A1 | 3/2015 | Shen |

FOREIGN PATENT DOCUMENTS

| | | | |
|---|---|---|---|
| CN | 104423002 | | 3/2015 |
| CN | 104563171 | | 4/2015 |
| CN | 105445889 | | 3/2016 |
| CN | 105898112 | | 8/2016 |
| CN | 106908961 | | 6/2017 |
| CN | 207336891 | | 5/2018 |
| CN | 207336891 U | * | 5/2018 |
| CN | 207340018 | | 5/2018 |
| EP | 1 612 778 | | 1/2006 |
| EP | 2 073 047 | | 6/2009 |
| JP | 2005-10307 | | 1/2005 |
| JP | 2005010307 A | * | 1/2005 |
| TW | M426775 | | 4/2012 |
| WO | 2011/052325 | | 5/2011 |

OTHER PUBLICATIONS

International Search Report issued Sep. 27, 2019 in International (PCT) Application No. PCT/CN2019/095389 with English translation.

* cited by examiner

| Comparison table between VDI3400 standard and Ra | | | |
|---|---|---|---|
| VDI 3400 | Ra μm | VDI 3400 | Ra μm |
| 0 | 0.1 | 23 | 1.4 |
| 1 | 0.112 | 24 | 1.6 |
| 2 | 0.126 | 25 | 1.8 |
| 3 | 0.14 | 26 | 2 |
| 4 | 0.16 | 27 | 2.2 |
| 5 | 0.18 | 28 | 2.5 |
| 6 | 0.2 | 29 | 2.8 |
| 7 | 0.22 | 30 | 3.2 |
| 8 | 0.25 | 31 | 3.5 |
| 9 | 0.28 | 32 | 4 |
| 10 | 0.32 | 33 | 4.5 |
| 11 | 0.35 | 34 | 5 |
| 12 | 0.4 | 35 | 5.6 |
| 13 | 0.45 | 36 | 6.3 |
| 14 | 0.5 | 37 | 7 |
| 15 | 0.56 | 38 | 8 |
| 16 | 0.63 | 39 | 9 |
| 17 | 0.7 | 40 | 10 |
| 18 | 0.8 | 41 | 11.2 |
| 19 | 0.9 | 42 | 12.6 |
| 20 | 1 | 43 | 14 |
| 21 | 1.12 | 44 | 16 |
| 22 | 1.26 | 45 | 18 |

OPTICAL CAMERA LENS, INCLUDING AT LEAST THREE SMOOTH REGIONS FOR REFLECTING A LIGHT BEAM EMITTED BY DISTANCE MEASURING EQUIPMENT CAMERA MODULE AND ASSEMBLY METHOD THEREOF

CROSS REFERENCES TO RELEVANT APPLICATIONS

This application claims the priority and rights of the Chinese patent application No. 201810923170.5 entitled "Optical Camera Lens, Camera Module And Assembly Method Thereof" filed with the China National Intellectual Property Administration (CNIPA) on Aug. 14, 2018, and which is in its entirety herein incorporated by reference.

TECHNICAL FIELD

This application relates to the field of optical imaging technology. Specifically, this application relates to an optical camera lens, a camera module and an assembly method thereof.

BACKGROUND

With the popularity of mobile electronic equipment, related technologies of camera modules used in mobile electronic equipment to help users acquire images (such as videos or images) have been developed and advanced rapidly, and in recent years, camera modules have been widely used in many fields such as medical treatment, security and industrial production, etc.

In order to meet the more and more extensive market requirements, high pixels, small size, and large aperture are the irreversible development trends of existing camera modules. However, it is very difficult to achieve the three requirements of high pixels, small size, and large aperture in the same camera module. For example, the compact development of mobile phones and the increase in the proportion of mobile phone screens have made a space for a front camera module inside the mobile phone smaller and smaller, and the accommodation space for the front camera module of the mobile phone is much smaller than that of a rear camera of the mobile phone. However, the pursuit of characteristics such as high pixels and large aperture has determined that it is difficult to further reduce the size of the lens in the optical design of the camera lens.

On the other hand, the market has proposed higher and higher requirements for imaging quality of camera module. For mass-produced optical camera lenses and camera modules, it is also necessary to consider the quality of optical imaging camera lenses and the manufacturing errors in the module encapsulation process. Specifically, in the manufacturing process of an optical imaging camera lens, the factors affecting the resolution of the camera lens come from errors of each element and its assembly, an error of a thickness of a lens spacer element, an error of assembly fitting of each camera lens, and a change of refractive index of the camera lens material, etc. Among them, each element and its assembly errors includes a thickness of an optical surface of each camera lens monomer, a vector height of the optical surface of the lens, a shape of the optical surface, a radius of curvature, an eccentricity of a single surface and between lens surfaces, a tilt of the optical surface of the lens, etc., and the amount of these errors depends on molding die accuracy and molding accuracy control ability. The error of the thickness of the lens spacer element depends on the processing accuracy of the element. The error of the assembly fitting of each lens depends on the size tolerance of the assembled elements and the assembly accuracy of the camera lens. The error introduced by the change of the refractive index of the camera lens material depends on the stability of the material and batch-to-batch consistency. The errors of the above-mentioned elements affecting the resolution are cumulative and deteriorated, and the cumulative errors will continue to increase as the number of camera lenses increases. The existing resolution solution is to control the size tolerance of the elements with high relative sensitivity and to compensate for the rotation of the camera lens to improve the resolution. However, because the camera lens with high pixels and large aperture is more sensitive, it requires strict tolerances, for example: 1 μm lens eccentricity of some sensitive camera lenses will cause 9' image plane tilt, which makes lens processing and assembly more and more difficult. At the same time, due to the long feedback cycle during the assembly process, the process capability index (CPK) of camera lens assembly is low and fluctuates greatly, resulting in a high defective rate. And as mentioned above, because there are many factors that affect the resolution of the camera lens, which exist in multiple elements, the control of each factor has a limit of manufacturing accuracy. If only the accuracy of each element is improved, the improvement ability is limited, the improvement cost is high, and it cannot meet market's increasing requirements for image quality.

The applicant proposes an assembly method, which includes: adjusting and determining a relative position of upper and lower sub-lens based on an active calibration process (the upper and lower sub-lens may sometimes be called upper and lower groups or upper and lower camera lens elements), and then bonding the upper and lower sub-lens together according to the determined relative position, thereby manufacturing a complete optical camera lens or camera module. This solution can improve the process capability index (CPK) of mass-produced optical camera lenses or camera modules; it can loosen the requirements for the accuracy of each element of the material (such as the sub-lens or photosensitive assembly used to assemble optical camera lenses or camera modules) and its assembly accuracy, thereby reducing an overall cost of the optical imaging camera lens and camera module; it can adjust various aberrations of the camera module in real time during the assembly process, thereby reducing defective rate, reducing production costs, and improving imaging quality.

However, actively calibrating an optical system of the camera lens itself is a new production process, which needs to be improved in terms of production efficiency, automation, and safety measures. For example, the current active calibration process requires pre-positioning of the upper and lower sub-lens so that the optical system composed of the upper and lower sub-lens can perform imaging, and then actual imaging results of the optical system are collected, and a resolution defocus curve is drawn according to the actual imaging results, and the imaging quality of the optical system in the current state is analyzed according to the resolution defocus curve. If the imaging quality in the current state cannot reach the standard, the relative position of the upper and lower sub-lens should be adjusted, and then the above process should be repeated, and the cycle should be continued until the imaging quality reaches the standard. It should be noted that when respectively using the calibration target and the photosensitive chip as the object side and image side of the actively calibrated testing optical path, for each relative position of the upper and lower sub-lens, the drawing of the resolution defocus curve requires moving the photosensitive chip along the optical path to record the measured resolution of a series of positions, so each cycle in the active calibration process will consume a certain amount of time. Moreover, active calibration is a personalized calibration, that is, the adjustment paths of each group of upper and lower sub-lens are different. In other words, to adjust the state of the optical system to reach the imaging quality standard requires many trials and errors. All of the above factors may reduce the production efficiency of optical camera lenses based on the active calibration process, which is not conducive to mass production. It should be noted that in the industry circles, the output of camera modules of the same specification (for example, mobile phone camera modules) can be as high as tens of millions or even hundreds of millions, so production efficiency is often one of important indicators to be considered.

On the other hand, the adjustment range of active calibration is limited, that is, active calibration is usually suitable for finding an optimal position and posture of the analytical force within a smaller adjustment range. If a precision of a pre-adjustment is insufficient, the amount of adjustment required for the relative position of each sub-lens is too large compared with the relative position of the good quality sub-lens, which exceeds the limit of active correction. As a result, it is impossible to assemble an optical camera lens or a camera module that reaches the imaging quality standard, and then the yield of the product drops.

SUMMARY OF THE INVENTION

The purpose of the present application is to provide a solution that can overcome at least one defect of the prior art.

According to an aspect of the present application, there provides an optical camera lens, which includes: a first camera lens component including at least one first lens; a second camera lens component including a second lens barrel and at least one second lens mounted in the second lens barrel, and the at least one second lens and the at least one first lens together constituting an imageable optical system; at least one of the first camera lens component and the second camera lens component having a smooth region, and the smooth region being suitable for reflecting light beam emitted by a distance measuring equipment, and the smooth region being located on an end surface of at least one of the first camera lens component and the second camera lens component; and a connecting medium suitable for fixing the first camera lens component and the second camera lens component together.

Wherein, the end surface is a top surface or a bottom surface of a camera lens component, and the camera lens component includes the first camera lens component or the second camera lens component.

Wherein, the smooth region includes at least three smooth regions of spot shape located on the top surface or bottom surface of the camera lens component; and a size of each of the smooth regions of spot shape is larger than a size of the light beam emitted by the distance measuring equipment.

Wherein, the smooth region is an annular smooth region, and the annular smooth region surrounds a light-passing hole of the camera lens component.

Wherein, the top surface of the first camera lens component has a convex structure or a concave structure, and the top surface of the convex structure or the bottom surface of the concave structure forms the smooth region.

Wherein, the top surface of the first camera lens component has at least three convex or concave structures, and the top surface of the convex structures or the bottom surface of the concave structures forms at least three smooth regions of spot shape.

Wherein, the top surface of the second camera lens component has the smooth region.

Wherein, the top surface of the second camera lens component further has a glue painting region, and the glue painting region is suitable for arranging glue material as the connecting medium.

Wherein, a roughness of the smooth region is smaller than that of the glue painting region.

Wherein, the glue painting region is annular shape, and the smooth region is located inside or outside the glue painting region.

Wherein, the glue painting region is annular shape, and the smooth region is located in the glue painting region.

Wherein, the second camera lens component further includes a motor, the second lens barrel is mounted inside a carrier of the motor, and the smooth region of the second camera lens component is located on a top surface of the motor.

Wherein, the connecting medium is a first glue material, there is a gap between the first camera lens component and the second camera lens component in a direction along the optical axis, and the first glue material is located in the gap.

Wherein, the first glue material is suitable for supporting and fixing the first camera lens component and the second camera lens component, and makes a relative position of the first camera lens component and the second camera lens component to be maintained at a relative position determined by an active calibration; and an included angle between the optical axis of the first camera lens component and the optical axis of the second camera lens component is not zero.

Wherein, the roughness of the smooth region is not larger than VDI23.

Wherein, the number of the first lens is one.

Wherein, the first camera lens component further includes a first lens barrel, and the at least one first lens is mounted inside the first lens barrel.

According to another aspect of the present application, there also provides a camera module, which includes any of the aforementioned optical camera lenses.

According to another aspect of the present application, there also provides a camera module, which includes an optical camera lens and a photosensitive assembly; wherein, a top surface of the photosensitive assembly is bonded to a bottom surface of the optical camera lens by a second glue material, and the top surface of the photosensitive assembly has a smooth region and a glue painting region, wherein the smooth region is suitable for reflecting a light beam emitted by a distance measuring equipment, the glue painting region is suitable for arranging the second glue material, and a roughness of the smooth region is smaller than that of the glue painting region.

Wherein, the glue painting region is annular shape, and the smooth region is located inside or outside the annulus.

Wherein, the glue painting region is annular shape, and the smooth region is located in the glue painting region.

According to another aspect of the present application, there also provides an assembly method of optical camera lens, which includes: preparing a first camera lens component and a second camera lens component that are separated from each other, wherein the first camera lens component includes a first lens barrel and at least one first lens mounted in the first lens barrel, and the second camera lens component includes a second lens barrel and at least one second lens mounted in the second lens barrel, and at least one of the first camera lens component and the second camera lens component has a smooth region, and the smooth region is suitable for reflecting light beam emitted by a distance measuring equipment, and the smooth region is located on an end surface of at least one of the first camera lens component and the second camera lens component; illuminating the smooth region with the distance measuring equipment for multi-point distance measuring, recognizing an inclination angle of the first camera lens component and/or the second camera lens component, and then pre-positioning the first camera lens component and the second camera lens component according to the recognized inclination angle to make at least one second lens and at least one first lens together constitute an imageable optical system; adjusting and determining a relative position between the first camera lens component and the second camera lens component based on an active calibration; and bonding the first camera lens component and the second camera lens component by glue material, wherein the glue material supports and fixes the first camera lens component and the second camera lens component after being cured, so that the relative position of the first camera lens component and the second camera lens component is maintained at the relative position determined by the active calibration.

Wherein, the pre-positioning includes pre-adjusting a posture of the first camera lens component and/or the second camera lens component so that a posture error between the first camera lens component and the second camera lens component is controlled within 0.01 degrees.

Wherein, the active calibration includes: grasping and moving the first camera lens component through a grasping mechanism to adjust and determine the relative position between the first camera lens component and the second camera lens component.

Wherein, the active calibration further includes: moving the first camera lens component along an adjustment plane, determining the relative position between the first camera lens component and the second camera lens component on the adjustment plane according to an actual measurement resolution based on an actual imaging result of the optical system; the relative position on the adjustment plane includes a relative position on a direction of translation and/or a direction of rotation on the adjustment plane.

Wherein, the active calibration further includes: adjusting and determining an included angle of an axis of the first camera lens component and an axis of the second camera lens component according to the actual measurement resolution based on the actual imaging result of the optical system.

Wherein, the active calibration further includes: moving the first camera lens component along a direction perpendicular to the adjustment plane, and determining the relative position between the first camera lens component and the second camera lens component in the direction perpendicular to the adjustment plane according to the actual measurement resolution based on the actual imaging result of the optical system.

According to another aspect of the present application, there also provides an assembly method of camera module, which includes: assembling an optical camera lens using any of the aforementioned assembly methods of optical camera lens; and mounting the optical camera lens on a photosensitive assembly.

According to another aspect of the present application, there also provides an assembly method of camera module, which includes: preparing an optical camera lens and a photosensitive assembly that are separated from each other, wherein an end surface of the optical camera lens and/or the photosensitive assembly has a smooth region, and the smooth region is suitable for reflecting light beam emitted by a distance measuring equipment; illuminating the smooth region with the distance measuring equipment for multi-point distance measuring, recognizing an inclination angle of the optical camera lens and/or the photosensitive assembly, and then pre-positioning the optical camera lens and the photosensitive assembly according to the recognized inclination angle; adjusting and determining a relative position of the optical camera lens and the photosensitive assembly based on the active calibration; and bonding the optical camera lens and the photosensitive assembly by glue material, wherein the glue material supports and fixes the optical camera lens and the photosensitive assembly after being cured, so that the relative position of the optical camera lens and the photosensitive assembly is maintained at the relative position determined by the active calibration.

Wherein, the pre-positioning includes pre-adjusting a posture of the optical camera lens and/or the photosensitive assembly so that a posture error between the optical camera lens and the photosensitive assembly is controlled within 0.01 degrees.

Compared with prior art, the present application has at least one of the following technical effects:
1. The present application can improve a pre-positioning accuracy between components that are actively calibrated by improving a distance measuring (height measuring) accuracy, thereby facilitating subsequent active calibration and assembly.
2. The present application can set the distance measuring point as a convex or concave, and then act as a feature point of image recognition so as to perform pre-positioning and active calibration.
3. The present application can improve the assembly accuracy of optical camera lens and camera module.

BRIEF DESCRIPTION OF THE DRAWINGS

Exemplary examples are shown in the referenced drawings. The examples and drawings disclosed herein should be regarded as illustrative rather than restrictive.

DETAILED DESCRIPTION OF EMBODIMENTS

In order to better understand the present application, various aspects of the present application will be described in more detail with reference to the drawings. It should be understood that these detailed descriptions are only descriptions of exemplary embodiments of the present application, and are not intended to limit the scope of the present application in any way. Throughout the specification, the same reference numerals refer to same elements. The expression "and/or" includes any and all combinations of one or more of the associated listed items.

It should be noted that in this specification, expressions such as first, second, etc. are only used to distinguish one feature from another feature, and do not represent any restriction on the feature. Therefore, without departing from the teaching of the present application, the first subject discussed below may also be referred to as the second subject.

In the drawings, the thickness, size, and shape of objects have been slightly exaggerated for ease of description. The drawings are only examples and are not drawn strictly to scale.

It should also be understood that the terms "including", "includes", "having", "containing" and/or "contains", when used in this specification, mean that the stated features, bodies, steps, operations, elements and/or components exists, but does not exclude the presence or addition of one or more other features, bodies, steps, operations, elements, components and/or their combinations. In addition, when expressions such as "at least one of" appear after the list of listed features, the entire listed feature is modified instead of individual elements in the list. In addition, when describing the embodiments of the present application, the use of "may" means "one or more embodiments of the present application". And, the term "exemplary" is intended to refer to an example or illustration.

As used herein, the terms "substantially", "approximately", and similar terms are used as approximate terms, not as terms representing degree, and are intended to illustrate the inherent deviation in the calculated value or the measurement that will be recognized by those skilled in the art.

Unless otherwise defined, all terms (including technical terms and scientific terms) used herein have the same meanings as commonly understood by those skilled in the art to which this application belongs. It should also be understood that terms (such as those defined in commonly used dictionaries) should be interpreted as having meanings consistent with their meanings in the context of related technologies, and will not be interpreted in an idealized or excessively formal sense unless this is clearly defined in this article.

It should be noted that the embodiments in this application and the features in the embodiments can be combined with each other if there is no conflict. Hereinafter, the present application will be described in detail with reference to the drawings and in conjunction with embodiments.

Figure 1:
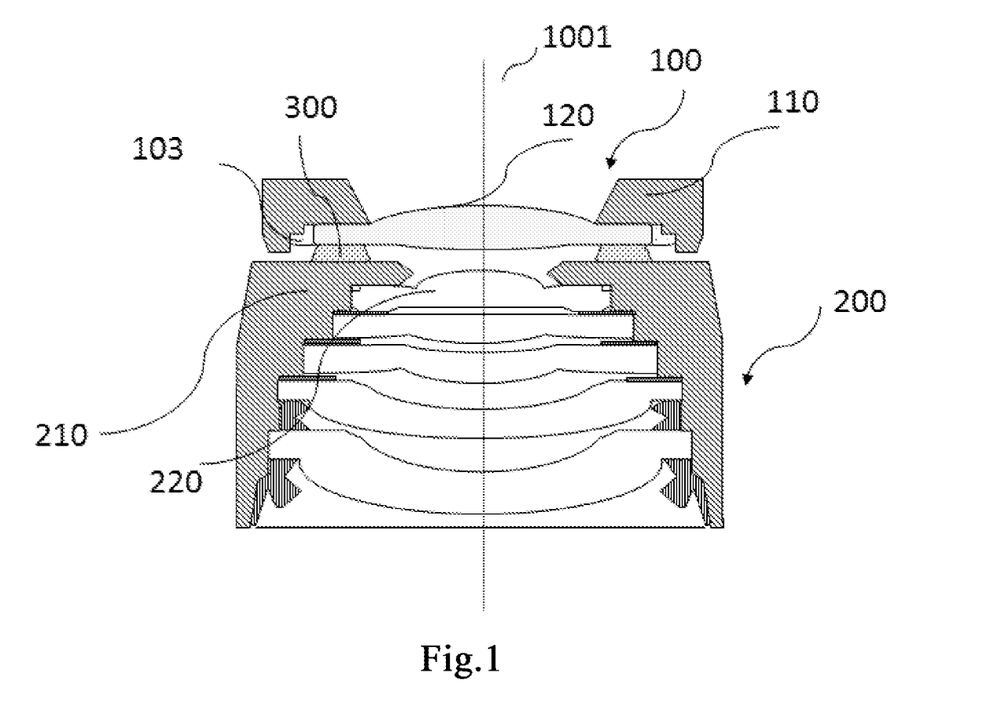
FIG. 1 shows a cross-sectional schematic view of an optical camera lens 1000 in one embodiment of the present application.

FIG. 1 shows a cross-sectional schematic view of an optical camera lens 1000 in one embodiment of the present application. As shown in FIG. 1, the optical camera lens 1000 includes a first camera lens component 100, a second camera lens component 200, and a first glue material 300. Wherein, the first camera lens component 100 includes a first lens barrel 110 and a first lens 120 mounted in the first lens barrel 110, and the first lens 120 can be fixed to the first lens barrel 110 by bonding glue 103. The second camera lens component 200 includes a second lens barrel 210 and multiple second lenses 220 mounted in the second lens barrel 210. The multiple second lenses 220 and the first lens 120 together constitute an imageable optical system. The first glue material 300 can be arranged between the first camera lens component 100 and the second camera lens component 200. For example, there is a gap between the first camera lens component 100 and the second camera lens component 200 in a direction along the optical axis, and the first glue material 300 is located in the gap.

Figure 2:
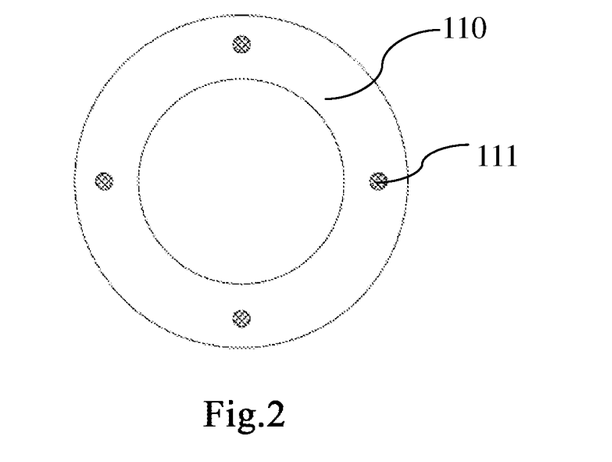
FIG. 2 shows a top schematic view of a first camera lens component 100 in one embodiment of the present application.
Figure 3:
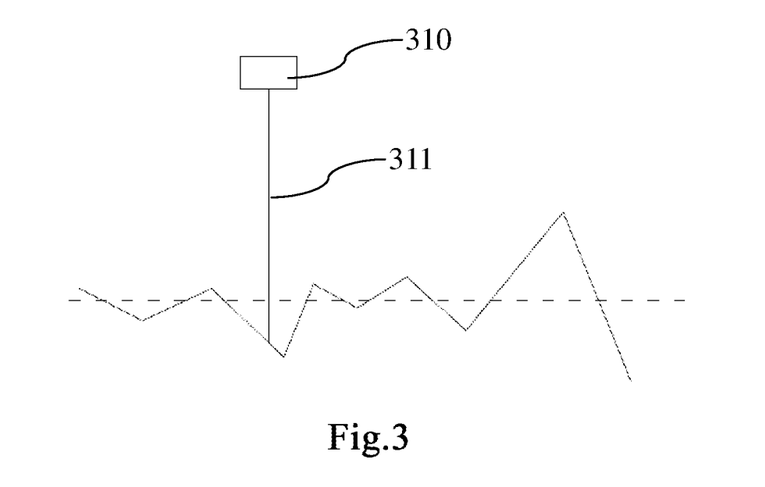
FIG. 3 shows a schematic view that a distance measuring equipment measures a distance of a rough surface thereto.
Figure 4:
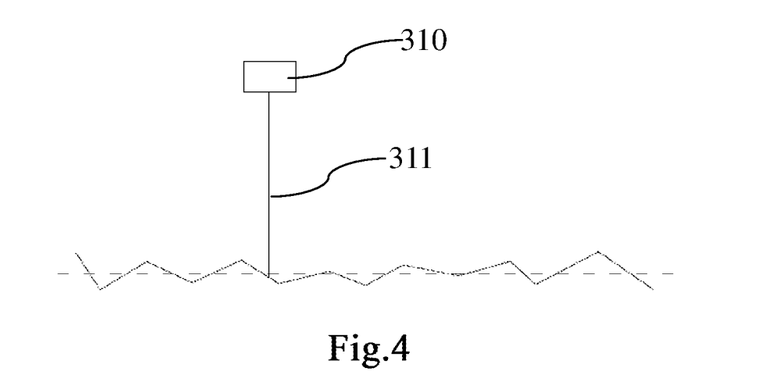
FIG. 4 shows a schematic view that the distance measuring equipment measures a distance of a smooth surface thereto.

Further, FIG. 2 shows a top schematic view of the first camera lens component 100 in one embodiment of the present application. Referring to FIG. 2, in this embodiment, a top surface of the first camera lens component 100 has multiple regions as laser distance measuring feature points, and these regions as feature points can be convex structures. The top surface of the convex structure is set to have a roughness smaller than other regions, thereby forming a smooth region 111. In the embodiment, the above convex structures are arranged on a top surface of the first lens barrel 110. The corresponding concave structures can be set in a molding die of the first lens barrel 110 and its roughness can be adjusted so as to make the first lens barrel 110 with the above convex structures. At the time of assembling the optical camera lens, a laser distance measuring equipment is arranged directly above the first camera lens component to measure a distance to the above-mentioned feature points (that is, the smooth top surfaces of the convex structures), so that an angle of a plane represented by these feature points can be calculated by multi-point distance measuring, and then an angle of the first camera lens component at this time can be obtained. In this way, as long as an inclination angle of the second camera lens component 200 is further obtained, the first camera lens component and the second camera lens component can be accurately pre-adjusted to make a relative position of the two close to an optimal position, which facilitates subsequent active calibration steps. And, because the regions as the feature points of laser distance measuring are smooth regions 111, therefore a distance measuring error caused by the roughness of the surfaces of the feature points can be reduced. FIG. 3 shows a schematic view that the distance measuring equipment measures a distance of a rough surface thereto. FIG. 4 shows a schematic view that the distance measuring equipment measures a distance of a smooth surface thereto. In FIG. 3 and FIG. 4, the boxes 310 represent lasers, the vertical curves 311 represent laser columns, the dashed line represents ideal fitting plane, and the solid broken line represents actual surface profile. As can be seen, when the roughness of the surface is large, a actual test point height may deviate greatly from a height of the ideal fitting plane, and an error of the inclination angle of the first camera lens component (the inclination angle can also be understood as a plane tilt of the first camera lens component) calculated from a plane fitted by several points with large height deviation will also be large. On the contrary, for a surface with smaller surface roughness, the error of the plane tilt of the first camera lens component obtained will also be small. Therefore, setting the laser distance measuring feature points into smooth regions helps to reduce the error of the inclination angle of the first camera lens component recognized by the distance measuring equipment, thereby improving an accuracy of a pre-adjustment between the first camera lens component and the second camera lens component. The number of feature points on the top surface of the first lens barrel is usually not less than three, because three points can determine a plane, and the inclination angle of the plane can be obtained by measuring the distance (measuring the height) of the three points separately. Further, the above convex structure is also helpful as a marking point for image recognition of the first camera lens component. By taking a picture of the first camera lens component from above, the x and y axis positions of the multiple convex structures in the captured image can be obtained through image recognition, and then the x and y positions of the first camera lens component can be obtained. Wherein, x and y respectively represent two rectangular coordinate axes on a plane perpendicular to the optical axis of the optical camera lens, and the coordinate axis of the optical axis direction is represented by z.

It should be noted that in a variant embodiment, the above convex structure can be replaced with a concave structure, and the smooth surface is a bottom surface of the concave structure. Further, in another embodiment, the above convex structure can also be removed, and the smooth region is at the same height as the top surface of the first camera lens component. The smooth region is not limited to spot shape, for example, the smooth region can also be ribbon shape. The smooth region is not limited to circle shape, for example, the smooth region can also be rectangle shape, triangle shape, ribbon-like arc shape, etc. In summary, the shape of the smooth region in the present application is not limited, as long as it is suitable for reflecting the light beam emitted by the distance measuring equipment, so as to realize the plane tilt recognition based on the multi-point distance measuring.

Further, in one embodiment, the first glue material 300 is suitable for fixing the first camera lens component 100 and the second camera lens component 200 together. For example, the first glue material 300 is suitable for supporting and fixing the first camera lens component 100 and the second camera lens component 200, and makes the relative position of the first camera lens component 100 and the second camera lens component 200 to be maintained at the relative position determined by the active calibration. Wherein, the active calibration is to calibrate the relative position of the first camera lens component 100 and the second camera lens component 200 based on the actual resolution curve measured by the actual imaging of the optical system, so as to improve the imaging quality of the optical camera lens.

Figure 5:
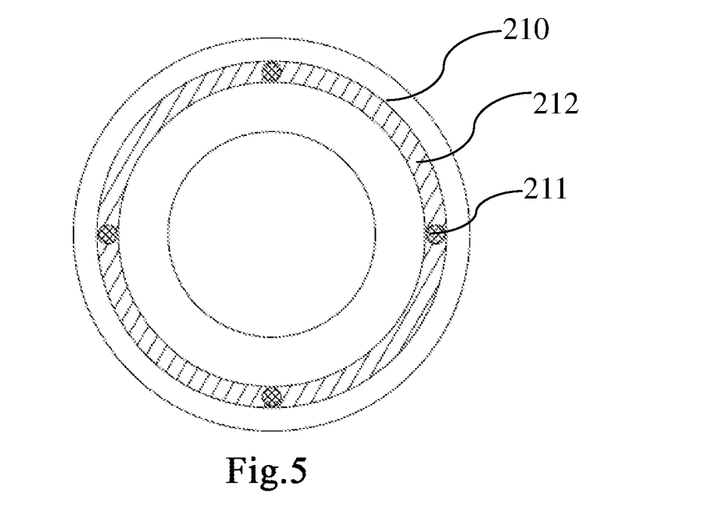
FIG. 5 shows a top schematic view of a second camera lens component 200 in one embodiment of the present application.
Figure 6:
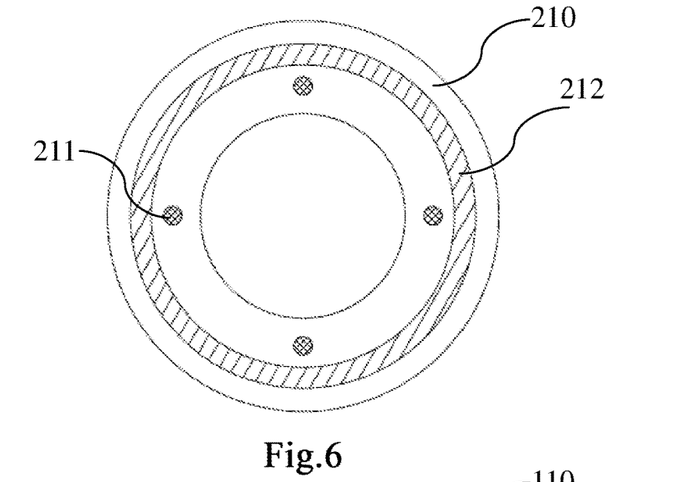
FIG. 6 shows a top schematic view of a second camera lens component 200 in another embodiment of the present application.

Further, FIG. 5 shows a top schematic view of the second camera lens component 200 in one embodiment of the present application. Referring to FIG. 5, in this embodiment, a top surface of the second camera lens component 200 has multiple regions as laser distance measuring feature points, these regions as feature points are set to be less rough than other regions on the top surface, thereby forming a smooth region. In this embodiment, since the first glue material 300 needs to be arranged between the second camera lens component and the first camera lens component, that is to say, the top surface of the second camera lens component needs to function as a bonding surface of glue material. In order to ensure the bonding performance, a certain surface roughness is required for the bonding position with the glue material. Therefore, in this embodiment, several height measuring points can be taken on a glue painting path 212 (also called a glue painting region) on the top surface of the second lens component 200 to make a smaller roughness to ensure high measurement accuracy. In one example, as shown in FIG. 5, the glue painting region can be annular shape. The height measuring points (that is, the smooth region 211) is located in the glue painting region. FIG. 6 shows a top schematic view of the second camera lens component 200 in another embodiment of the present application. In this embodiment, a point located outside the glue painting path 212 can be used as the height measuring point, and the region selected as the height measuring point can be made with a smaller roughness to form the smooth region 211. Preferably, the height measuring point is as close as possible to the glue painting path. It should be noted that, in this description, the meaning of the smooth region being outside the glue painting path include both a case in which the smooth region is located inside the annular glue painting path (as shown in FIG. 6), and a case in which the smooth region is located outside the annular glue painting path (not shown in the figure). The above smooth regions of the top surface of the second camera lens component 200 are suitable for reflecting the light beam emitted by the distance measuring equipment, so as to realize the plane tilt recognition based on the multi-point distance measuring. After obtaining the plane tilt of the first camera lens component and the plane tilt of the second camera lens component, the first camera lens component and the second camera lens component can be pre-positioned by non-active imaging during a pre-adjustment stage of assembling the optical camera lens, so that the relative position of the two is close to the ideal position, thereby facilitating the subsequent active calibration step. The smooth region is not limited to spot shape, for example, the smooth region can also be ribbon shape. The smooth region is not limited to circle shape, for example, the smooth region can also be rectangle shape, triangle shape, ribbon-like arc shape, etc. In summary, the shape of the smooth region in the present application is not limited, as long as it is suitable for reflecting the light beam emitted by the distance measuring equipment, so as to realize the plane tilt recognition based on the multi-point distance measuring.

In the above embodiment, the number of the first lenses is one, it should be noted that the present application is not limited thereto, for example, in another embodiment, the number of the first lenses can be multiple, such as two or three. Further, in one embodiment, the first lens barrel can be removed, that is, the first camera lens component can be composed of a single first lens, which can include an optical region for imaging and a structural region outside the optical region. In this embodiment, the smooth region suitable for reflecting the light beam emitted by the distance measuring equipment can be set on a top surface of the structural region. Further, in one embodiment, when the first camera lens component is composed of a single first lens, the single first lens can be a composite lens formed by multiple sub-lenses that are integrated with each other. Further, in one embodiment, when the first camera lens component is composed of a single first lens, the structural region of the first lens can form a light shielding layer (for example, the light shielding layer is made on a surface and a side of the structural region by screen printing process) so as to form a diaphragm.

In addition, in some embodiments, the laser distance measuring equipment can also be arranged below the first camera lens component and the second camera lens component, the smooth region suitable for reflecting the light beam emitted by the distance measuring equipment can be arranged at the bottom surface of the first camera lens component or/and the bottom surface of the second camera lens component. For the convenience of description, the top surface and bottom surface are collectively called end surfaces.

Further, according to another embodiment of the present application, there also provides an assembly method of optical camera lens, which includes the following steps S10-S40.

Step S10, preparing a first camera lens component 100 and a second camera lens component 200 that are separated from each other, wherein the first camera lens component 100 includes a first lens barrel 110 and at least one first lens mounted in the first lens barrel 110, and the second camera lens component 200 includes a second lens barrel 210 and at least one second lens mounted in the second lens barrel 210. In this embodiment, the number of the first lenses is one. The number of the second lenses is multiple. And a top surface of the first camera lens component 100 and a top surface of the second camera lens component 200 have smooth regions, and the smooth regions can be used as height measuring points of a distance measuring equipment.

Step S20, using the smooth region for distance measuring (for example, laser distance measuring), calculating inclination of the first camera lens component 100 and the second camera lens component 200 based on a multi-point positioning method (that is, calculating a plane tilt of the first camera lens component 100 and/or the second camera lens component 200), and then pre-positioning the first camera lens component 100 and the second camera lens component 200 to make at least one second lens and at least one first lens 120 together constitute an imageable optical system. The pre-positioning can include adjusting a position and a posture of the first camera lens component 100 and/or the second camera lens component 200. Wherein, adjusting the position can be understood as adjusting x, y, z positions of the first camera lens component 100 and/or the second camera lens component 200, and adjusting the posture can be understood as adjusting an inclination (or a plane tilt) of the first camera lens component 100 and/or the second camera lens component 200. In this description, x and y respectively represent two rectangular coordinate axes on a plane perpendicular to the optical axis 1001 of the optical camera lens (as shown in FIG. 1), and the coordinate axis in the direction of the optical axis 1001 is represented by z.

In this embodiment, setting the laser distance measuring feature point to the smooth region helps to reduce errors of an inclination angle and a z-spacing of the first and/or second camera lens components recognized by the distance measuring equipment, thereby improving the accuracy of the pre-adjustment between the first camera lens component and the second camera lens component. The number of feature points is usually not less than three. In this embodiment, a posture error between the first camera lens component and the second camera lens component can be controlled within 0.01 degrees after the posture is pre-adjusted.

Further, for the first camera lens component, the smooth region can be designed as a convex structure, which helps to serve as a marking point for image recognition of the first camera lens component. By taking pictures of the first camera lens component from above, the x and y axis positions of the multiple convex structures in the captured image can be obtained through image recognition, and then the x and y positions of the first camera lens component can be obtained.

Step S30, adjusting and determining a relative position between the first camera lens component 100 and the second camera lens component 200 based on an active calibration. In step S20, the position relationship of multiple groups (including the first camera lens component and the second camera lens component) has been accurately recognized by setting the smooth region with reduced roughness, thereby realizing accurate pre-positioning without capturing image. In this step, due to the limited adjustment range of the active calibration (finding the optimal position and posture of analytical force within a smaller adjustment range), it is necessary to adjust the positions of the two to a position closer to the ideal assembly relative position in step S20. With the pursuit of the performance of the camera module, the accuracy requirement of pre-adjustment is also constantly improving, and the accuracy requirement of height measuring is also constantly improving. If the pre-adjustment position exceeds the limit of the active calibration, the product with performance up to specification cannot be obtained. This embodiment can effectively avoid the difference between the pre-adjustment result and the relative position and posture of camera lens components required to obtain a good product from exceeding the limit of active calibration, thereby improving the product yield.

Step S40, bonding the first camera lens component 100 and the second camera lens component 200 by glue material. In this step, the first camera lens component 100 and the second camera lens component 200 are supported and fixed with a cured glue material to maintain the relative position of the first camera lens component 100 and the second camera lens component 200 at the relative position determined by the active calibration.

Further, in one embodiment, the glue material 300 can be coated in the gap between the first camera lens component 100 and the second camera lens component 200 before the step S30 is performed, and then step S30 is performed to adjust and determine the relative position of the first camera lens component 100 and the second camera lens component 200. After the relative position is determined, step S40 is performed to cure the glue material 300, and then the cured glue material 300 is used to support the first camera lens component 100 and the second camera lens component 200, so that the relative position of the first camera lens component 100 and the second camera lens component 200 is maintained at the relative position determined by the active calibration. In another embodiment, step S30 can be performed first to adjust and determine the relative position of the first camera lens component 100 and the second camera lens component 200. After determining the relative position, the first camera lens component 100 (or the second camera lens component 200) is temporarily moved away, then the glue material coating is performed, and then the first camera lens component 100 (or the second camera lens component 200) is moved back based on the determined relative position. Finally, the glue material is cured so that the relative position of the first camera lens component 100 and the second camera lens component 200 is maintained at the relative position determined by active calibration.

Figure 10A:
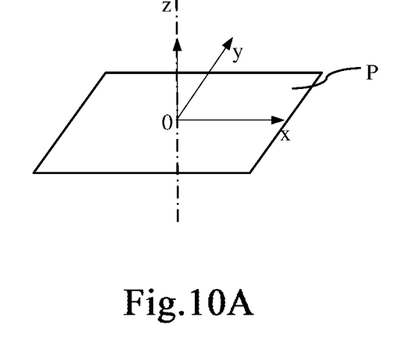
FIG. 10A shows a relative position adjustment manner in an active calibration in one embodiment of the present application.

Further, the active calibration described in the present application can adjust the relative position of the first camera lens component 100 and the second camera lens component 200 at multiple degrees of freedom. FIG. 10A shows a relative position adjustment manner in the active calibration in one embodiment of the present application. In this adjustment manner, the first camera lens component 100 (or the first lens 120) can move along the x, y, and z directions relative to the second camera lens component 200 (that is, the relative position adjustment in this embodiment has three degrees of freedom). Wherein the z direction is the direction along the optical axis, and the x and y directions are the directions perpendicular to the optical axis. The x and y directions are both in an adjustment plane P, and a translation in the adjustment plane P can be decomposed into two components in the x and y directions.

Figure 10B:
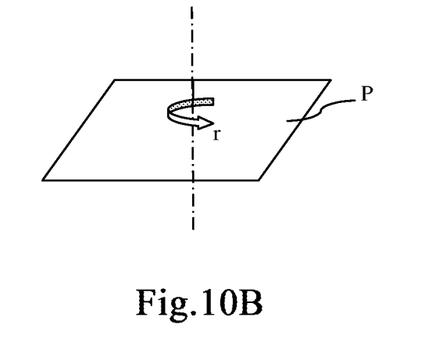
FIG. 10B shows a rotation adjustment in an active calibration in another embodiment of the present application.

FIG. 10B shows a rotation adjustment in the active calibration in another embodiment of the present application. In this embodiment, in addition to the three degrees of freedom in FIG. 10A, the relative position adjustment is further added with a degree of freedom in rotation, that is, an adjustment in a r direction. In this embodiment, the adjustment in the r direction is the rotation in the adjustment plane P, that is, the rotation around an axis perpendicular to the adjustment plane P.

Figure 10C:
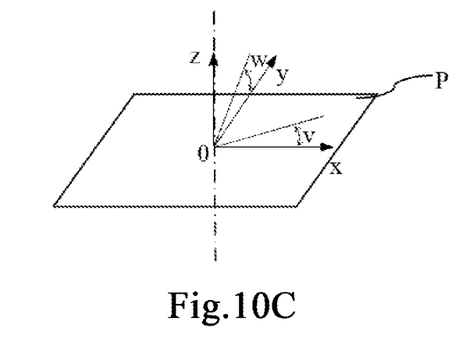
FIG. 10C shows a relative position adjustment manner added with adjustment in v and w directions in an active calibration in another embodiment of the present application.

Further, FIG. 10C shows a relative position adjustment manner added with adjustment in v and w directions in the active calibration in another embodiment of the present application. Wherein, the v direction represents a rotation angle of the xoz plane, and the w direction represents a rotation angle of the yoz plane, the rotation angles of the v direction and the w direction can be combined into a vector angle, and this vector angle represents a total tilt state. That is to say, by adjusting the v and w directions, a tilt posture of the first camera lens component 100 relative to the second camera lens component 200 can be adjusted (that is, a tilt of the optical axis of the first camera lens component 100 relative to the optical axis of the second camera lens component 200).

The adjustment of the six degrees of freedom of x, y, z, r, v, and w may all affect the imaging quality of the optical system (for example, affect the magnitude of the resolution). In other embodiments of the present application, the relative position adjustment manner can be to adjust only any one of the above six degrees of freedom, or a combination of any two or more of them.

Further, in one embodiment, in the active calibration step, the movements further include a translation on the adjustment plane, that is, the movements in the x, y directions.

Further, in one embodiment, the active calibration further includes: adjusting and determining an included angle between the axis of the first camera lens component 100 and the axis of the second camera lens component 200 according to the actual measured resolution of the optical system, that is, the adjustment in the w and v directions. In the assembled optical camera lens or camera module, the included angle between the axis of the first camera lens component 100 and the axis of the second camera lens component 200 can be non-zero.

Further, in an embodiment, the active calibration further includes: moving the first camera lens component along a direction perpendicular to the adjustment plane (that is, adjustment in the z direction), according to the actual measured resolution of the optical system (that is, the actual measurement resolution based on the actual imaging result of the optical system), determining the relative position between the first camera lens component and the second camera lens component in the direction perpendicular to the adjustment plane.

Further, in one embodiment, in the pre-positioning step (step 20), there is a gap between a bottom surface of the first camera lens component and a top surface of the second camera lens component; and in the bonding step (step 40), the glue material is arranged in the gap.

Further, in one embodiment, in the preparing step (step 10), the first camera lens component can also not have a first lens barrel. For example, the first camera lens component can be composed of a single first lens. In the pre-positioning step (step 20), there is a gap between a bottom surface of the first lens and a top surface of the second camera lens component; and in the bonding step (step 40), the glue material is arranged in the gap. In this embodiment, the first lens can be formed by multiple sub-lenses that are integrated with each other to form a whole. In this embodiment, a side surface and a top surface of non-optical surface of the first lens that are not used for imaging can form a light shielding layer. The light shielding layer can be formed by screen printing a light shielding material on the side and top surface of the first lens.

In one embodiment, in the active calibration step, the second camera lens component can be fixed, the first camera lens component can be clamped by a clamp, and the first camera lens component can be moved under a drive of a six-axis motion mechanism connected with the clamp, thereby realizing the relative movement between the first camera lens component and the second camera lens component in the above six degrees of freedom. Wherein the clamp can be leaned against or partially leaned against the side surface of the first camera lens component, thereby clamping the first camera lens component.

Further, in one embodiment, the glue material can be coated in the gap between the first camera lens component and the second camera lens component before the step S30 is performed, and then step 30 is performed to adjust and determine the relative position of the first camera lens component and the second camera lens component. After the relative position is determined, step 40 is performed to cure the glue material, and then the cured glue material is used to support the first camera lens component and the second camera lens component, so that the relative position of the first camera lens component and the second camera lens component is maintained at the relative position determined by the active calibration. In another embodiment, step 30 can be performed first to adjust and determine the relative position of the first camera lens component and the second camera lens component. After determining the relative position, the first camera lens component (or the second camera lens component) is temporarily moved away, then the glue material coating is performed, and then the first camera lens component (or the second camera lens component) is moved back based on the determined relative position. Finally, the glue material is cured so that the relative position of the first camera lens component and the second camera lens component is maintained at the relative position determined by the active calibration.

In one embodiment, the glue material can be UV thermosetting glue, in step 40, the second camera lens component is fixed on a platform, the first camera lens component is grasped using a grasping mechanism (for example, a clamp), so that the relative position of the first camera lens component and the second camera lens component is maintained at the relative position determined by the active calibration, and then the UV thermosetting glue is precured by exposure, and then the grasping mechanism (for example, a clamp) is loosened, since the precured glue material supports the first camera lens component and the second camera lens component, the two are kept in the relative position determined by the active calibration, then the first camera lens component and the second camera lens component combined together are baked to permanently cure the UV thermosetting glue, and finally a finished optical camera lens is obtained. In another embodiment, the glue material can also include thermosetting glue and photo-curing glue (for example, UV glue), the photocuring glue is precured by exposure, and then the first camera lens component and the second camera lens component combined together are baked to permanently cure the thermosetting glue, thereby obtaining a finished optical camera lens.

It should be noted that in the above embodiment, the number of lenses of the first camera lens component 100 and the second camera lens component 200 can be adjusted as required. For example, the number of lenses of the first camera lens component 100 and the second camera lens component 200 can be two and four respectively, three and three respectively, four and two respectively, or five and one respectively. The total number of lenses of the entire optical camera lens can also be adjusted as required. For example, the total number of lenses of the optical camera lens can be six, five or seven.

It should also be noted that, lens components of the optical camera lens of the present application are not limited to two, for example, the number of lens components can also be a number greater than two such as three or four. When there are more than two camera lens components constituting the optical camera lens, two adjacent camera lens components can be regarded as the first lens component 100 described above and the second lens component 200 described above, respectively. For example, when the number of camera lens components of an optical camera lens is three, the optical camera lens can include two first camera lens components 100 and a second camera lens component 200 located between the two first camera lens components 100, and all of the first lenses of the two first camera lens components 100 and all of the second lenses of the second camera lens components 200 form an imageable optical system for the active calibration. When the number of camera lens components of an optical camera lens is four, the optical camera lens can include two first camera lens components 100 and two second camera lens components 200, arranged from top to bottom in the order of the first camera lens component 100, the second camera lens component 200, the first camera lens component 100, and the second camera lens component 200, and all of the first lenses of the two first camera lens components 100 and all of the second lenses of the two second camera lens components 200 together constitute an imageable optical system for the active calibration. Other variants such as the above mentioned are not repeated in this description.

Figure 11:
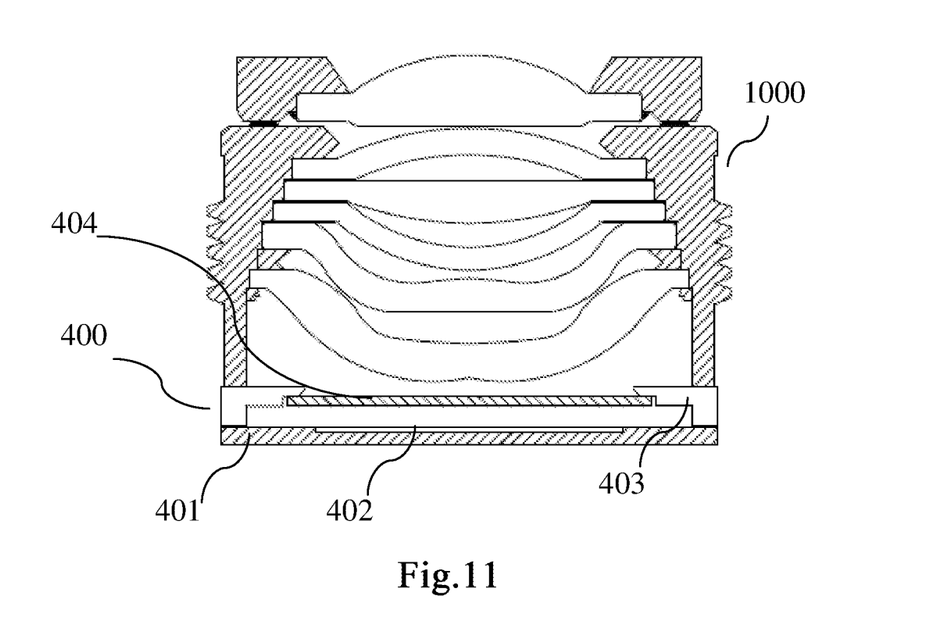
FIG. 11 shows a schematic view of a camera module in one embodiment of the present application.

Further, in another embodiment of the present application, there also provides a camera module based on the above optical camera lens. FIG. 11 shows a schematic view of a camera module in an embodiment of the present application. The camera module includes an optical camera lens 1000 (which includes a first camera lens component and a second camera lens component) and a photosensitive assembly 400. The optical camera lens can be an optical camera lens in any of the preceding embodiments. Photosensitive assembly 400 can include, for example, a circuit board 401, a photosensitive chip 402 mounted on a surface of the circuit board, an annular support 403 formed or mounted on the surface of the circuit board and surrounding the photosensitive chip (the annular support can also be called a lens holder), and a color filter 404. The color filter is mounted on the annular support.

In one embodiment, a top surface of the annular support can form steps (not shown in FIG. 11), and the color filter is mounted on the steps of the annular support. It should be noted that, the structure of the photosensitive assembly is not limited to the above embodiments, for example, the color filter in the photosensitive assembly can be attached to the photosensitive chip, the top surface of the lens holder can only maintain a size suitable for arrangement of glue material so as to reduce the size of the photosensitive assembly. The bottom of the second camera lens component is attached to the photosensitive assembly by the glue material arranged on the top surface of the lens holder, so that the second camera lens component and the photosensitive component are mounted (for example, they can be mounted based on the HA process) together to obtain the camera module component.

Further, in one embodiment of the present application, the camera module can also include a motor (or other types of optical actuators), the optical camera lens can be mounted in a cylindrical carrier of the motor, and a base of the motor is mounted on the top surface of the photosensitive assembly. Specifically, the base of the motor is mounted on the top surface of the annular support. The second camera lens component can form an assembly together with the motor, in the pre-positioning stage and the active calibration stage, the assembly as a whole and the first camera lens component perform position and posture adjustment. For ease of description, the motor can be considered as part of the second camera lens component. In this embodiment, the height measuring accuracy can be improved by reducing roughness of the top surface of the motor (that is, the smooth region can be located on the top surface of the motor), thereby obtaining more accurate position information to improve the subsequent assembly accuracy.

In one embodiment, the minimum diameter of each smooth region (that is, feature point) is determined by the diameter of the laser column, and the diameter of the laser column used for height measuring can be 20-30 microns. In this embodiment, the size of the smooth region is slightly larger than the diameter of the laser column used for height measuring and the shape is not limited.

In the above embodiment, the end faces of the camera lens components are provided with smooth regions for height measuring, this design idea can also be used for the photosensitive assembly, thereby improving the pre-adjustment accuracy of the assembly process of the optical camera lens and the photosensitive assembly. According to an embodiment of the present application, there provides a camera module, which assembles optical camera lens and photosensitive assembly by an AA process. The top surface of the photosensitive assembly has multiple regions as the feature points of laser distance measuring, and these regions as the feature points are set to have a roughness smaller than that of other regions of the top surface, thereby forming a smooth region. In one example, the above smooth regions are set on the top surface of the photosensitive assembly. In this embodiment, because the second glue material needs to be arranged between the optical camera lens and the photosensitive assembly, that is, the top surface of the photosensitive assembly needs to function as the bonding surface of the glue material. In order to ensure the bonding performance, the bonding position with the glue material needs a certain surface roughness. Therefore, in this embodiment, several height measuring points can be taken on the glue painting path on the top surface of the photosensitive assembly to make a smaller roughness to ensure high measuring accuracy. The above smooth regions on the top surface of the photosensitive component are all suitable for reflecting the light beam emitted by the distance measuring equipment, so as to realize the plane tilt recognition based on the multi-point distance measuring. After obtaining the plane tilt of the optical camera lens and the plane tilt of the photosensitive assembly, the optical camera lens and the photosensitive assembly can be pre-positioned by a non-active imaging in the pre-adjustment stage of the assembly of optical camera lens, so that the relative position of the two is close to the ideal position, thereby facilitating the subsequent active calibration step (that is, an AA step). The smooth region is not limited to spot shape, for example, the smooth region can also be ribbon shape. The smooth region is not limited to circle shape, for example, the smooth region can also be rectangle shape, triangle shape, ribbon-like arc shape, etc. In summary, the shape of the smooth region in the present application is unlimited, as long as it is suitable for reflecting the light beam emitted by the distance measuring equipment, so as to realize the plane tilt recognition based on the multi-point distance measuring. Wherein, the optical camera lens can be either an optical camera lens made by a traditional process with a single barrel, or an AOA camera lens. The AOA camera lens refers to a camera lens assembled by at least two camera lens components (such as upper camera group lens and lower group camera lens) based on an active calibration process.

In another embodiment, the point on the top surface of the photosensitive assembly located outside the glue painting path can be used as the height measuring position, and the region selected as the height measuring point can be made into a region with a smaller roughness to form the smooth region. Preferably, the height measuring point is as close to the glue painting path as possible. It should be noted that, in this description, the meaning of the smooth region being outside the glue painting path includes both the case in which the smooth region is located inside the annular glue painting path and the case in which the smooth region is located outside the annular glue painting path.

Figure 7:
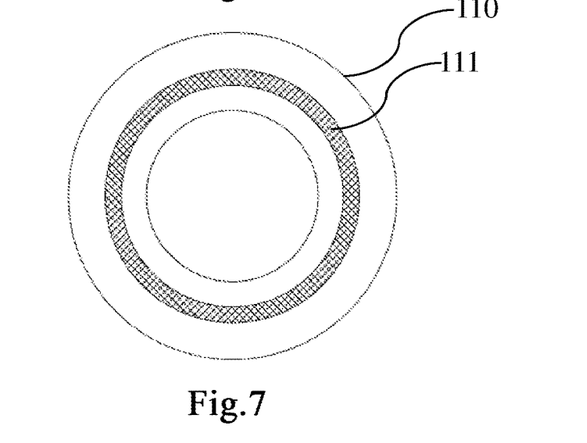
FIG. 7 shows a top schematic view of a top surface of a first lens barrel 110 in one embodiment of the present application.

In another embodiment, the smooth region can be annular. FIG. 7 shows a top schematic view of the top surface of a first lens barrel 110 in an embodiment of the present application. It can be seen that the smooth region 111 in FIG. 7 is an annular region around the light-passing hole, rather than a spotted region. When the distance measuring equipment performs distance measuring, at least three points at different positions of the annular smooth region 111 can be taken as feature points for distance measuring (that is, height measuring), thereby measuring the x, y position and inclination angle of the first camera lens component. In this embodiment, the corresponding annular area on the molding die is polished to form an annular smooth molding surface on the molding die, and the required camera lens component with an annular smooth region can be made by using this molding die. It should be noted that, in this embodiment, the annular smooth molding surface can be formed by one-time polishing, which can avoid the height difference between different distance measuring feature points introduced by multiple polishing, and help to improve the pre-positioning accuracy of camera lens components.

Figure 8:
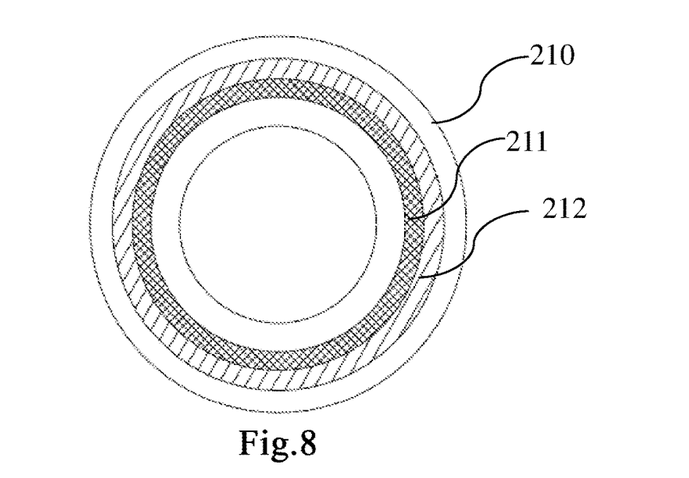
FIG. 8 shows a top schematic view of a top surface of a second lens barrel 210 in one embodiment of the present application.

FIG. 8 shows a top schematic view of the top surface of the second lens barrel 210 in an embodiment of the present application. In the embodiment, the top surface of the second lens barrel 210 includes an annular smooth region 211 and an annular glue painting region 212, wherein the annular smooth region 211 is located inside the glue painting region 212. The annular smooth region 211 surrounds the light-passing hole. Similar to the previous embodiment, in this embodiment, the molding die of the second camera lens component has an annular smooth molding surface, and the annular smooth molding surface can be formed by one-time polishing, which can avoid the height difference between different distance measuring feature points introduced by multiple polishing, and help to improve the pre-positioning accuracy of the camera lens components.

Figure 9:
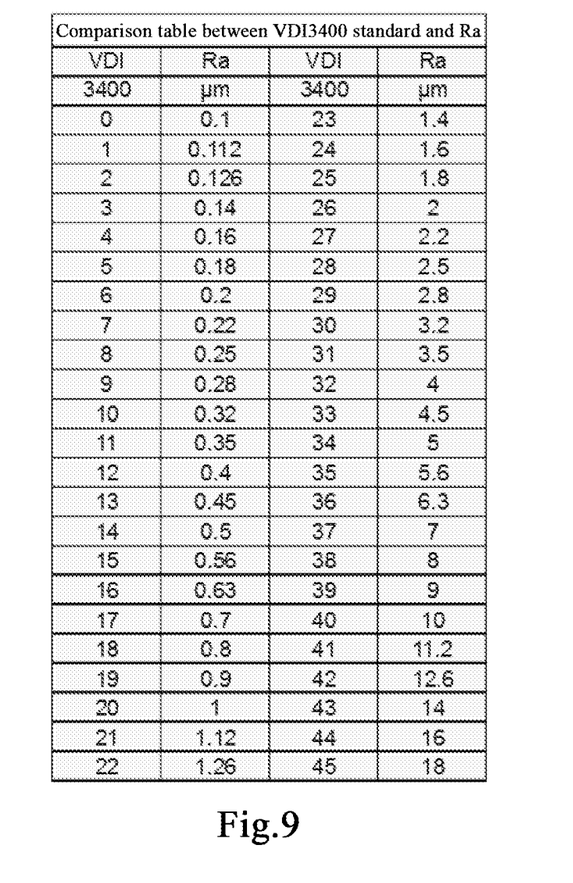
FIG. 9 shows a conversion relationship between roughness VDI and Ra.

Further, in one embodiment of the present application, the roughness of the smooth region can be VDI3 (it should be noted that, the present application is not limited to this, for example, in another embodiment, the roughness of the smooth region can be VDI23). In specific implementation, a molding die can be provided, and the surface roughness corresponding to the smooth region is VDI3 or lower, and then the lens barrel of the first or second camera lens component or the motor housing or the lens holder of the photosensitive assembly can be made with this molding die, that is, the end surface of the lens barrel of the first or second camera lens component or the motor housing or the lens holder of the photosensitive assembly can obtain a smooth region with a roughness of VDI3. The surface roughness of the current mainstream camera lens is VDI24 (the roughness of the lens barrel molding mould is VDI24). FIG. 9 shows a conversion relationship between roughness VDI and Ra. It can be seen that the roughness of the smooth region is significantly lower than that of the upper surface of the current mainstream camera lens. Wherein, VDI and Ra are two different standards for surface smoothness.

Further, an embodiment of the present application also provides another assembly method of camera module, which includes the following steps:

Step S100, preparing an optical camera lens and a photosensitive assembly that are separated from each other. Wherein, the optical camera lens can include a motor, a lens barrel and multiple lenses. The lens barrel is mounted in a carrier of the motor. A top surface of the motor has a smooth region suitable for reflecting light beam emitted by a distance measuring equipment. The smooth region can be a top surface of a convex structure or a bottom surface of a concave structure. A roughness of the smooth region can be significantly lower than that of the rest part of the top surface of the motor. In another embodiment, the smooth region can also be arranged on the top surface or other positions of the lens barrel as long as it can reflect the light beam emitted by the distance measuring equipment so as to realize plane tilt recognition based on multi-point distance measuring. The photosensitive assembly includes a lens holder, a top surface of which is suitable for arranging a second glue material for bonding with a base of the motor. A smooth region can also be set on the top surface of the lens holder to realize the plane tilt recognition based on the multi-point distance measuring.

Step S200, using the smooth region to perform distance measuring (for example, laser distance measuring), calculating an inclination angle of the optical camera lens and/or the photosensitive assembly based on a multi-point positioning method (that is, calculating a plane tilt of the optical camera lens and/or the photosensitive assembly), and then pre-positioning the optical camera lens and the photosensitive assembly. The pre-positioning can include an adjustment of a position and a posture of the optical camera lens and/or the photosensitive assembly. Wherein the adjustment of the position can be understood as an adjustment of x, y positions of the optical camera lens and/or the photosensitive assembly, and the adjustment of the posture can be understood as an adjustment of an inclination angle (or a plane tilt) of the optical camera lens and/or the photosensitive assembly. In this description, the x and y respectively represent two rectangular coordinate axes on a plane perpendicular to the optical axis of the optical camera lens, and the coordinate axis of the optical axis direction is represented by z.

In this embodiment, setting the laser distance measuring feature points into the smooth regions helps to reduce the error of the inclination angle of the optical camera lens and/or the photosensitive assembly recognized by the distance measuring equipment, thereby improving the accuracy of the pre-adjustment between the optical camera lens and the photosensitive assembly. In order to realize the multi-point distance measuring, the number of feature points is usually not less than three. In this embodiment, a posture error between the optical camera lens and the photosensitive assembly can be controlled within 0.01 degrees after the posture is pre-adjusted.

Further, for the optical camera lens, the smooth region can be designed as a convex or concave structure, and the convex structure is helpful as a marking point for image recognition of the first camera lens component. By taking a picture of the first camera lens component from above, x and y axis positions of the multiple convex structures in the captured image can be obtained by image recognition, and then x and y positions of the first camera lens component can be obtained.

Step S300, adjusting and determining a relative position of the optical camera lens and photosensitive assembly based on an active calibration. In step S200, a position relationship between the optical camera lens and the photosensitive assembly has been accurately recognized by setting the smooth region with reduced roughness, thereby realizing accurate pre-positioning without capturing image. Therefore, the difference between the pre-adjustment result and the relative position and posture of camera lens components required to obtain a good product can be effectively avoided from exceeding the limit of the active calibration, thereby improving the product yield.

Step S400, bonding the optical camera lens and the photosensitive assembly by a second glue material. In this step, a bottom surface of the optical camera lens and a top surface of the photosensitive assembly are supported and fixed by the cured glue material, so that the relative position of the optical camera lens and the photosensitive assembly is maintained at the relative position determined by the active calibration. In this embodiment, the second glue material is arranged between the bottom surface of the motor and the top surface of the lens holder.

The above description is only preferred embodiments of this application and an explanation of the applied technical principles. Those skilled in the art should understand that the scope of the application involved in this application is not limited to the technical solutions formed by the specific combination of the above technical features, and should also cover other technical solutions formed by any combination of above technical features and its equivalent features without departing from the concept of the application. For example, the above-mentioned features and the technical features disclosed in this application (but not limited to) with similar functions are mutually replaced to form a technical solution.

The invention claimed is:

1. An optical camera lens comprising:
a first camera lens component including at least one first lens;
a second camera lens component including a second lens barrel and at least one second lens mounted in the second lens barrel; and
a connecting medium suitable for fixing the first camera lens component and the second camera lens component together, wherein
the at least one second lens and the at least one first lens together constitute an imageable optical system,
at least one of the first camera lens component and the second camera lens component has at least three smooth regions, the at least three smooth regions being suitable for reflecting a light beam emitted by distance measuring equipment, and the at least three smooth regions being located on an end surface of the at least one of the first camera lens component and the second camera lens component,
the end surface is a top surface or a bottom surface of the at least one of the first camera lens component and the second camera lens component, and
the at least three smooth regions are of spot shape, a size of each of the at least three smooth regions being larger than a size of the light beam emitted by the distance measuring equipment.

2. The optical camera lens of claim 1, wherein the top surface of the first camera lens component has at least three convex or concave structures, and top surfaces of the convex structures or bottom surfaces of the concave structures form the at least three smooth regions of spot shape on the top surface or the bottom surface of the at least one of the first camera lens component and the second camera lens component.

3. The optical camera lens of claim 1, wherein the top surface of the second camera lens component has the at least three smooth regions.

4. The optical camera lens of claim 3, wherein the top surface of the second camera lens component further has a glue painting region, and the glue painting region is suitable for arranging glue material as the connecting medium.

5. The optical camera lens of claim 4, wherein a roughness of the at least three smooth regions is smaller than that of the glue painting region.

6. The optical camera lens of claim 5, wherein the glue painting region is annular-shaped, and the at least three smooth regions are located inside or outside the glue painting region.

7. The optical camera lens of claim 5, wherein the glue painting region is annular-shaped, and the at least three smooth regions are located in the glue painting region.

8. The optical camera lens of claim 1, wherein the second camera lens component further includes a motor, the second lens barrel is mounted inside a carrier of the motor, and the at least three smooth regions are of the second camera lens component and are located on a top surface of the motor.

9. The optical camera lens of claim 1, wherein the connecting medium is a first glue material, and there is a gap between the first camera lens component and the second camera lens component in a direction along an optical axis of the optical camera lens, and the first glue material is located in the gap.

10. The optical camera lens of claim 9, wherein
the first glue material is suitable for supporting and fixing the first camera lens component and the second camera lens component, and maintains a relative position of the first camera lens component and the second camera lens component at a relative position determined by an active calibration, and an included angle between an optical axis of the first camera lens component and an optical axis of the second camera lens component is not zero.

11. The optical camera lens of claim 10, wherein a roughness of the at least three smooth regions is not larger than Verein Deutscher Ingenieure 23 (VDI23).

12. The optical camera lens of claim 1, wherein the at least one first lens is one first lens.

13. The optical camera lens of claim 1, wherein the first camera lens component further includes a first lens barrel, and the at least one first lens is mounted inside the first lens barrel.

14. A camera module comprising an optical camera lens and a photosensitive assembly, wherein
  a top surface of the photosensitive assembly is bonded to a bottom surface of the optical camera lens by a second glue material,
  the top surface of the photosensitive assembly has a smooth region and a glue painting region,
  the smooth region is suitable for reflecting a light beam emitted by distance measuring equipment,
  the glue painting region is suitable for arranging the second glue material, and
  a roughness of the smooth region is smaller than that of the glue painting region.

15. An assembly method of an optical camera lens, the assembly method comprising:
  preparing a first camera lens component and a second camera lens component that are separated from each other, wherein the first camera lens component includes a first lens barrel and at least one first lens mounted in the first lens barrel, and the second camera lens component includes a second lens barrel and at least one second lens mounted in the second lens barrel, at least one of the first camera lens component and the second camera lens component has a smooth region, the smooth region is suitable for reflecting a light beam emitted by distance measuring equipment, and the smooth region is located on an end surface of the at least one of the first camera lens component and the second camera lens component;
  illuminating the smooth region with distance measuring equipment for multi-point distance measuring, recognizing an inclination angle of the first camera lens component and/or the second camera lens component, and then pre-positioning the first camera lens component and the second camera lens component according to the recognized inclination angle to make at least one second lens and at least one first lens together constitute an imageable optical system;
  adjusting and determining a relative position between the first camera lens component and the second camera lens component based on an active calibration; and
  bonding the first camera lens component and the second camera lens component by a glue material, the glue material supporting and fixing the first camera lens component and the second camera lens component after curing, so that a relative position of the first camera lens component and the second camera lens component is maintained at the relative position determined by the active calibration.

16. The assembly method of an optical camera lens of claim 15, wherein the pre-positioning includes pre-adjusting a posture of the first camera lens component and/or the second camera lens component so that a posture error between the first camera lens component and the second camera lens component is controlled within 0.01 degrees.

* * * * *